UNITED STATES PATENT OFFICE.

FRANZ MUSIL EDLER VON MOLLENBRUCK, OF LINZ, AUSTRIA-HUNGARY.

MANUFACTURE OF CEMENT.

No. 844,530.                Specification of Letters Patent.            Patented Feb. 19, 1907.

Application filed September 22, 1906. Serial No. 335,783.

*To all whom it may concern:*

Be it known that I, FRANZ MUSIL EDLER VON MOLLENBRUCK, a subject of the Emperor of Austria, residing at Linz-on-the-Danube, have invented new and useful Improvements in the Manufacture of Cements, of which the following is a specification.

This invention relates to the manufacture of a cement which imparts to objects made from it a high resistance to bending.

For the manufacture of my cement good Portland cement or a similar mortar-former is mixed with fibrous material and the mixture ground in suitable apparatus. Experience has shown that the mere mixture of Portland cement and fibrous materials does not effect any intimate mixture between the two substances. All fibers possess a considerable inclination to adhere to one another, and this characteristic is not overcome by merely mixing them with cement, so that it is not possible to obtain a homogeneous fine distribution of the fibers in the cement. This result can only be attained by simultaneously grinding the materials in which the fibers are not yet separated with the cement. In this way the individual fibers are laid bare and inclosed in cement-dust and do not adhere or conglomerate. The fibrous cement made as above described is manipulated in the ordinary way.

The process forming the subject of this invention differs from the usual method of adding to cement fibrous materials—such as asbestos, cellulose, slag, wool, and the like—in that the fibrous substances are not only mixed together loose, but at the moment of their being separated out are surrounded by cement in the form of a layer of dust. Attempts have also been made to mix asbestos and cement in a mill; but this process possesses the disadvantage that large quantities of water are necessary, and the mixture must be used immediately after its manufacture. Such cement cannot be manufactured for stock.

In lieu of mixtures of Portland cement and fibrous materials I may intimately grind mixtures of fibrous materials, blast-furnace slag, and calcined lime. This mixture is less durable; but articles made therefrom possess strength which is equal to that of articles made from Portland cement and fiber.

Having now particularly described and ascertained the nature of my said invention and in what manner the same is to be performed, I declare that what I claim is—

1. The method of manufacturing cement consisting in first mixing cementitious material with fibrous material and then grinding said mixture whereby a more intimate mixture of the cementitious and fibrous materials is secured, substantially as described.

2. The method of manufacturing cement consisting in first mixing cement with a fibrous material and then grinding said mixture, whereby a more intimate mixture of cement and fibers is secured, substantially as described.

3. The method of manufacturing cement, consisting in first mixing Portland cement with a fibrous material and then grinding said mixture whereby said ingredients are more intimately mixed, substantially as described.

FRANZ MUSIL EDLER VON MOLLENBRUCK.

Witnesses:
ANTON PRINZ,
MORIZ BERGER.